Figure 4:
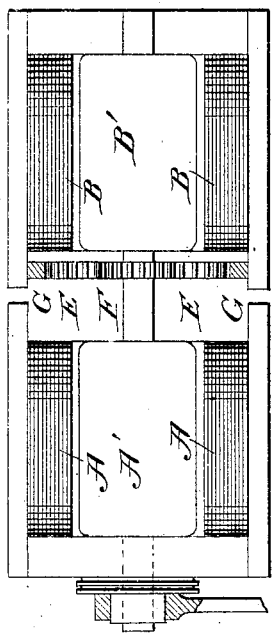

No. 805,416. PATENTED NOV. 21, 1905.
E. R. ESMOND.
ELECTRIC MOTOR.
APPLICATION FILED OCT. 25, 1904.
2 SHEETS—SHEET 1.
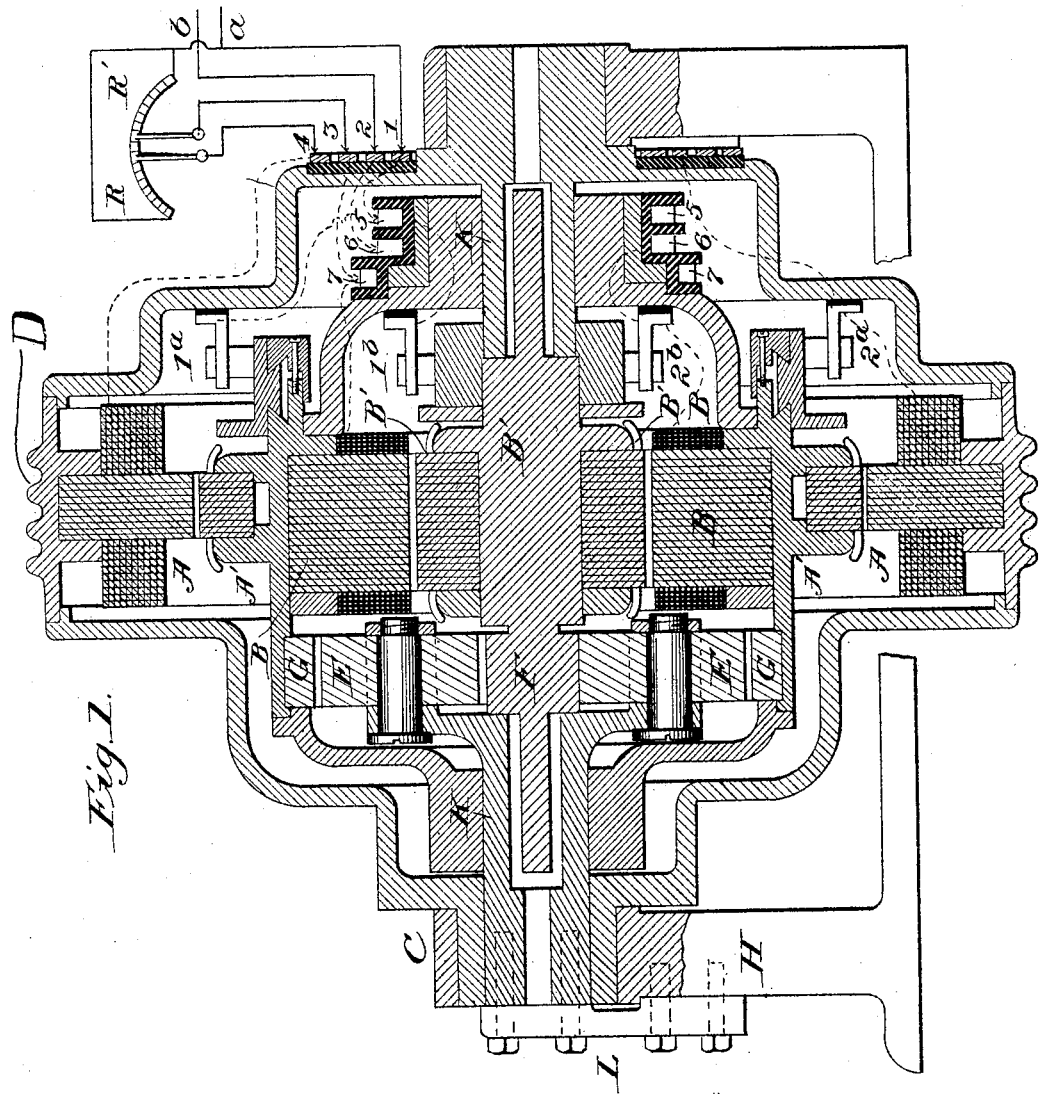
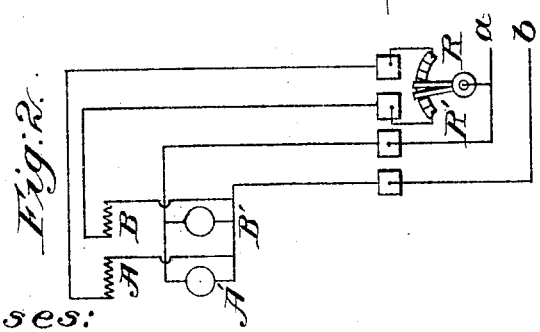
Witnesses:
L. T. Shaw
M. A. Moder
Inventor:
E. R. Esmond
by Bentley and Primm
attys.

No. 805,416. PATENTED NOV. 21, 1905.
E. R. ESMOND.
ELECTRIC MOTOR.
APPLICATION FILED OCT. 25, 1904.

2 SHEETS—SHEET 2.

Witnesses:
L. T. Shaw
M. A. Moder

Inventor:
E. R. Esmond
by Bentley and Pierson
attys

UNITED STATES PATENT OFFICE.

ERNEST R. ESMOND, OF NEW YORK, N. Y.

ELECTRIC MOTOR.

No. 805,416. Specification of Letters Patent. Patented Nov. 21, 1905.

Continuation of application Serial No. 73,037, filed August 23, 1901. This application filed October 25, 1904. Serial No. 229,970.

*To all whom it may concern:*

Be it known that I, ERNEST R. ESMOND, a citizen of the United States, residing in the city of New York, borough of Manhattan, county and State of New York, have invented certain new and useful Improvements in Electric Motors, of which the following is a specification, reference being made to the accompanying drawings, wherein—

Figure 1 is a vertical section of the motor apparatus constructed in accordance with my invention. Fig. 2 is a diagram of the circuits. Figs. 3 to 6 illustrate diagrammatically the fundamental principles of my invention in different forms.

My invention relates to a system of motor control applicable to various situations where motors are employed to drive mechanism at a variable speed, but finds a particular field of usefulness in the operation of elevators.

My invention consists in a certain combination of two motors coöperating to drive the mechanism to be operated and capable of regulation by a slight change in the field-magnet strength of one, of which one runs continuously and also keeps in continuous operation one of the elements of the other.

More particularly, I provide two motors, each of which may have its elements rotatable, so that when driving the load all four of the elements are in motion. Two or more elements are geared to each other, and one of them is connected to the load to be driven. Two geared elements are designed to be kept in constant rotation and may continuously rotate the unloaded element of the other motor. All the four elements are intended to be permanently energized, while the stopping, starting, and regulation of the speed is secured by a slight change in the field-magnet strength of one element, both of the motors being preferably of the shunt type.

Referring to Fig. 1, which illustrates one of the various forms which the invention may assume, A represents the field-magnet of an electric motor, which is journaled in bearings C and carries with it the sheave D, which represents the load and which in the particular case illustrated is designed to drive the cable of an elevator.

A' is the armature corresponding to the field-magnet A and is shown as contained within the said field-magnet, being journaled upon the bearing K, which projects inward from the surrounding framework of the field-magnet A, that turns thereon and is attached to standard H by a brace L. The field-magnet B of the second motor is contained within the armature A' of the external motor and is made fast thereto, so as to rotate with it.

B' is the armature of the interior motor, journaled on the inside of the bearings K K aforesaid. The armature B' carries a pinion F, which meshes with two pinions E E, journaled upon projections from the bearings K K and which in turn mesh with an internal gear-wheel G, carried by the field-magnet B. It will thus be apparent that the internal motor has its armature B' geared to its field-magnet B in a definite ratio, which in the example shown is five to one. Hence both members of the internal motor will rotate, but at different speeds, so that, for example, if the normal speed is twelve hundred the armature will have a speed of one thousand and the field-magnet two hundred. The circuits of these two machines are shown in diagram in Fig. 2, both being of the shunt type with their field-magnet strength adjustable and their armatures in multiple. Thus if $a$ and $b$ are the two supply-wires the armature A' and B' will be connected directly therewith in multiple, and likewise the field-magnets A and B, the former field-magnet being regulated by the adjustable resistance R and the latter by adjustable resistance R'.

While the electrical connections of the motors will be understood by one skilled in the art, it may be noted in Fig. 1 that from lines $a$ and $b$ the armature-wires are led to contact-rings 1 and 2, whence they pass to the two commutator-brushes $1^a$ $1^b$ $2^a$ $2^b$ in the multiple. The field-magnet wires lead from wire $a$ through rheostats R and R' to rings 3 and 4, respectively, whence they pass one through the inner and the other through the outer field-magnet coil and thence by the brush $2^b$ of the corresponding motor to the line-wire $b$ 5 6 7 are collector-rings on the middle revolving structure connected with the terminals of the internal motor and having brushes (shown by dotted arrows) on the outer structure connected with the rings 1 2 3.

Figure 6:
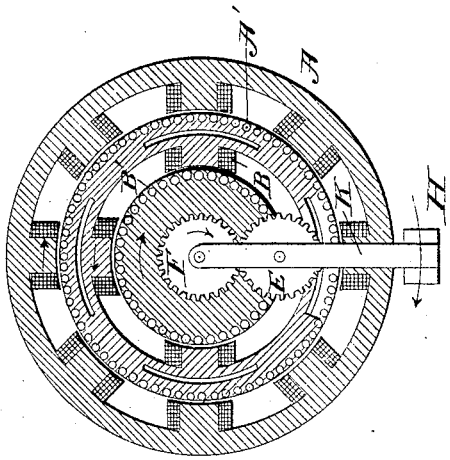

In Fig. 6 the mechanical connection of these two machines is illustrated diagrammatically, it being remembered that the intermediate pinions E E are journaled upon extensions from the bearings K K. In the diagram of Fig. 6 the bearing K is indicated by a strip K, shown as pinned at its outer extremity to the standard H. Near its center it carries the intermediate pinion E, the other intermediate pinion E being omitted for simplicity of illustration. It will be assumed, for example, that when both field-magnets have their full strength the inner motor will have an armature speed of one thousand and a field-magnet speed of two hundred, while the outer motor under like conditions will have an armature speed of two hundred and a field-magnet speed of forty, it being desired to have the sheave D rotate forty turns per minute. If now there is current flowing in all four of the motor elements, with the motor A having its full field strength and the motor B having but eighty-three and one-third of its full strength, then there will be no torque exerted upon the field-magnet A, since the interior-motor field will be running slightly above its normal speed—viz., at two hundred and forty turns per minute—giving the armature A' the same speed, and this being the normal speed of the external motor its counter electromotive force will just equal the direct electromotive force and admit but little current to the armature. The load will then remain stationary while both elements of the internal motor and the armature of the external motor will be running free. If then the field-magnet strength of the internal motor be raised to its normal point, then the internal field-magnet will tend to slow down to its normal rate of two hundred turns per minute and the field-magnet A of the external motor will begin to rotate and its armature will take current until it comes up to its normal speed of two hundred and forty, of which the armature will give two hundred and the field-magnet forty.

It should be observed that the torque of the inner motor should be adequate to move the load through the intervention of the torque of the outer motor, which is connected with the load, on the one hand, and, on the other hand, exerts its torque upon the field-magnet of the inner motor. Although both elements of the inner motor are made to rotate, yet by reason of the intervening pinions it will be impossible for one of them to be held against rotation and the other element compelled to run at the full relative speed, since the pinion, being connected to the stationary standard, forms an abutment against which one member may act to move the other member just as if it were stationary. If the two rotating members were not thus geared together, the motor would be unable to exert any external torque, since the loading of either member would simply cause it to stand still, while the other member would run free at a higher speed. By reason of the gearing there can be no movement of either member without a corresponding movement of the other, while each member will have its proportional part of the total speed dependent upon the gearing ratio. It will also be apparent that various other arrangements embodying the same principle as that already described may be employed and that the relations of field-magnet and armature may be reversed, so that any member appearing in the combination just described as a field-magnet may be made an armature, and vice versa.

Figure 3:
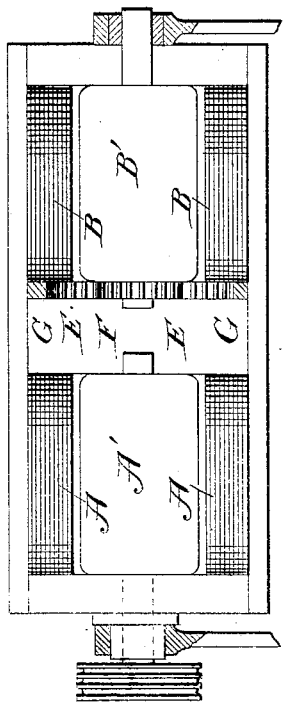

In Fig. 3, for example, the two motors are placed side by side instead of being arranged concentrically. In this case the armature A' will be connected to the load, while the field-magnets A and B will be joined together and geared to the armature B'. The action will then be the same as in the construction of Fig. 1, and the parts in the drawings are correspondingly lettered, so that a detailed description of the figure is not necessary.

In Fig. 4 the two armatures A' and B' are mounted upon the same shaft, so as to rotate together, while the field-magnet A is connected to the load and the field-magnet B is geared to the armature B'.

Figure 5:
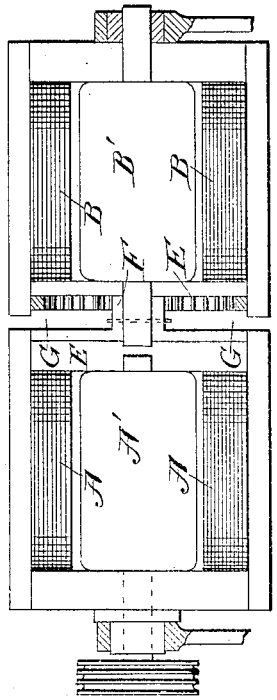

In Fig. 5 the armature A' is connected to the load, while its field-magnet A is connected to the armature B', so as to rotate therewith, while the field-magnet B is geared to its armature B'.

Various other combinations can be made embodying the essential principles of my invention, which will differ from those herein illustrated without departing from the spirit of the invention.

I am aware that it has been proposed to combine two motors for the driving of a common load by causing a motor having one of its members stationary to drive the field-magnet or armature of a generator whose non-driven member is connected to the load; but in my arrangement both are motors with their elements so geared or connected as to rotate at the same speed or at speeds having a definite fixed ratio by means of gearing. I believe this feature to be novel, as well as the feature of making all of the members rotatable. I also regard as novel all of the several features referred to in the following claims. One value of my invention as I now view it lies principally in its capacity for securing wide variations in speed with a comparatively small degree of change in the field-magnet strength of the component motors, while in their normal running they both have their full speed-magnet strength and the commutator difficulties which result from wide variations in field-magnet strength are avoided. I am also enabled to drive slow-speed mechanism with economy and good regulation while utilizing high speed in one at least of the two component motors. It is also to be noted that the gearing enables me to drive one of the elements of one motor by means of the second motor at a speed having any desired ratio to the speed of the second motor, by which I mean the relative speed of one element of the second motor with respect to the other element, whether such relative speed is due to the rotation of one or both of the elements. By this means I am enabled to drive the load at normal speed with both field-magnets at their full strength and to gain other important advantages, such as making the speed of the load independent of the normal speed to be given to the respective motors, since the speed of the load is determined by the adjustable differential between the speeds of the two members of the motor connected to the load when running with full field-magnet strength.

I intend to claim, broadly, herein an arrangement wherein any of the two rotating members of one of the motors is driven by the other motor with a gearing between such driven member and one of the members of the driving-motor. The special arrangements shown are but illustrations of some of the ways in which the several features of my invention may be embodied, and various other arrangements of the same general character may be employed without departing from the spirit of my invention.

This application is a continuation of my application, Serial No. 73,037, filed August 23, 1901.

What I claim as new, and desire to secure by Letters Patent, is—

1. The combination with two motors having three of the four motor members mechanically connected together, of means for regulating the speed of one or both of the said motors.

2. The combination with a motor having one of its members connected to the load, of a second motor for driving the other member, which motor has its own two members mechanically connected by intervening gearing.

3. The combination with two motors having all of their four members rotatable and mechanically connected in a suitable manner to the load and to one another respectively, of means for regulating the speed of one or both motors.

4. The combination with two motors having all of their members rotatable, one of the said members being connected to the load and the other three mechanically connected together, of means for regulating the speed of one or both motors.

5. The combination with a motor having both of its members rotatable and geared together, of a second motor having one of its members driven by the first motor and the other member driving the load.

6. The combination with a motor having its two members rotatable and geared together, of a second motor having one of its members driven by the first motor and its other element connected with the load and means for regulating the speed of the first motor by changes in its field-magnet strength.

7. The combination with an electric motor of a second electric motor driving one of the elements of the first motor and having relatively rotatable members, and gearing for fixing the rate of rotation of the driven member with respect to the relative rate of rotation of the two members of the driving-motor.

8. The combination with an external motor connected mechanically to a driven load of a concentric internal motor running at a higher speed of rotation and provided with a stationary abutment and driving one of the members of the external motor.

9. The combination with a motor having its outer member movable and connected to its load, of a second motor driving the internal member of the first motor and being itself contained in the said driven member.

10. The combination with an external motor having both of its members rotatable, of a concentric internal motor having both of its members rotatable and driving one member of the external motor and a gearing permitting a difference of speed between one of the internal-motor members and the said driven member.

11. The combination with an external slow-speed motor of an internal concentric high-speed motor driving one of the members of the external motor and having its own two members geared together.

12. The combination with a slow-speed motor of a high-speed motor driving one of the members of the first-named motor and a gearing for fixing the relative rates of rotation of the members in one motor to those in the other.

13. The combination with an electric motor having both members rotatable, of a second electric motor driving one of the members of the first motor and having relatively rotatable members, and a gearing for fixing the speed of the member so driven with respect to the relative speed of the members of the driving-motor.

14. The combination with two electric motors having their several members concentric and relatively rotatable in each motor, of a driving connection between two of such members in different motors respectively, and a gearing for fixing the speed of the driven member at a definite ratio with respect to the relative speed of the respective members of the driving-motor.

15. The combination of two motors having all of their several members concentric, a mechanical connection between one of the members of one motor and a member of the other motor, a load connected to one motor and a stationarily-mounted mechanical driving connection between the members of the other motor.

16. The combination with a motor having one normal speed, of a second motor with relatively rotatable members, said second motor having a different normal speed and driving one of the members of the first-named motor and a gearing for fixing the relative speed of the members in one motor with respect to that of the members in the other motor.

17. The combination with a motor having both its members rotatable, but operated at different speeds, of a second motor also having both its members rotatable but operated at different speeds and a mechanical connection between the slower member of one and the faster member of the other motor.

18. The combination with a motor having a given speed at full field-magnet strength, of a second motor having one member connected to the load and the other driven by the first motor, and means for adjusting the speed of the driving member of the first motor from a speed substantially equal to the combined speeds of the members of the second motor down to a speed substantially equal to said combined speeds less the normal speed of the member connected to the load.

19. The combination with a motor having its members geared to run at a given relative speed but at different actual speeds, of a second motor having both members rotatable, one member being connected to the load and the other to the slower member of the first motor, and means for adjusting the speed of said slower member of the first motor from a speed substantially equal to that of the combined speeds of the members of the second motor down to a speed substantially equal to said combined speeds less the normal speed of the member connected to the load.

20. The combination of a motor having a gearing between its two members which operate at different speeds, of a second motor having both members rotatable, one member being connected to the load and the other driven by the first motor, and means for adjusting the speed of said driven member from its normal speed when both members of the second motor are rotating, up to a speed equal to said normal speed plus the speed of its associated member.

21. The combination with a driven load of two dynamo-electric machines both acting as motors with full field-magnet strength, one connected to and driving the load, the second connected to and driving a member of the first and adapted to release the load and run free when the field-magnet strength of one motor is reduced.

In witness whereof I have hereunto set my hand, before two subscribing witnesses, this 8th day of September, 1904.

ERNEST R. ESMOND.

Witnesses:
  G. W. HOPKINS,
  M. A. MODER.